US008684605B2

(12) United States Patent
Schroeder (10) Patent No.: US 8,684,605 B2
(45) Date of Patent: *Apr. 1, 2014

(54) GUIDE RAIL

(75) Inventor: Robert Schroeder, Machesney Park, IL (US)

(73) Assignee: Pacific Bearing Company, Rockford, IL (US)

( * ) Notice: Subject to any disclaimer, the term of this patent is extended or adjusted under 35 U.S.C. 154(b) by 568 days.

This patent is subject to a terminal disclaimer.

(21) Appl. No.: 12/820,724

(22) Filed: Jun. 22, 2010

(65) Prior Publication Data

US 2010/0260446 A1    Oct. 14, 2010

Related U.S. Application Data

(63) Continuation-in-part of application No. 12/690,509, filed on Jan. 20, 2010, now Pat. No. 8,235,595, which is a continuation-in-part of application No. 12/398,205, filed on Mar. 5, 2009, now Pat. No. 8,029,193.

(60) Provisional application No. 61/034,540, filed on Mar. 7, 2008.

(51) Int. Cl.
*F16C 29/06* (2006.01)
*B21D 53/10* (2006.01)

(52) U.S. Cl.
USPC .............................. 384/55; 384/43

(58) Field of Classification Search
USPC ........................ 384/43–45, 55, 59
See application file for complete search history.

(56) References Cited

U.S. PATENT DOCUMENTS

| 1,500,116 | A | 7/1924 | Dowd |
| 2,229,015 | A | 1/1941 | King |
| 3,900,233 | A | 8/1975 | Thomson |
| 3,998,497 | A | 12/1976 | Koizumi |
| 4,023,503 | A | 5/1977 | Grop |
| 4,025,995 | A | 5/1977 | Thomson |
| 4,375,195 | A | 3/1983 | Tsuboi |
| 4,635,331 | A | 1/1987 | Walter et al. |
| 4,682,899 | A | 7/1987 | Andersson et al. |

(Continued)

FOREIGN PATENT DOCUMENTS

| DE | 1 222 322 | 8/1966 |
| DE | 3 504 061 A1 | 8/1986 |

(Continued)

OTHER PUBLICATIONS

U.S. Appl. No. 12/625,171, filed Nov. 24, 2009, Schroeder.

(Continued)

*Primary Examiner* — Thomas R Hannon
(74) *Attorney, Agent, or Firm* — Reinhart Boerner Van Deuren P.C.

(57) ABSTRACT

A guide rail that includes a base rail having a channel therein and at least one finger extending from a portion of the channel. The guide rail further includes a race insert mounted against the at least one finger. In an embodiment of the invention, the race insert has a first and second raceway associated with the at least one finger extending from a portion of the channel. Further, the first and second raceways have different load transmission directions, wherein the load transmission directions of both the first and second raceways are oblique to the direction that the at least one finger extends from a portion of the channel.

14 Claims, 5 Drawing Sheets

(56) References Cited

U.S. PATENT DOCUMENTS

| | | | |
|---|---|---|---|
| 5,059,037 A | 10/1991 | Albert | |
| 5,211,279 A | 5/1993 | Abbestam et al. | |
| 5,217,308 A | 6/1993 | Schroeder | |
| 5,289,779 A | 3/1994 | Ohya et al. | |
| 5,431,498 A | 7/1995 | Lyon | |
| 5,755,516 A | 5/1998 | Teramachi et al. | |
| 5,800,065 A | 9/1998 | Lyon | |
| 5,806,986 A | 9/1998 | Barth et al. | |
| 5,930,898 A | 8/1999 | Lyon | |
| 6,052,902 A | 4/2000 | Lyon | |
| 6,086,254 A | 7/2000 | Lyon | |
| 6,149,308 A | 11/2000 | Schroeder et al. | |
| 6,450,687 B1 | 9/2002 | Schroeder et al. | |
| 6,484,599 B2 | 11/2002 | Blaurock | |
| 6,508,589 B2 | 1/2003 | Kashiwagi et al. | |
| 7,300,208 B2 | 11/2007 | Kuellstaedt et al. | |
| 7,752,978 B2 | 7/2010 | Schroeder | |
| 2001/0012417 A1 | 8/2001 | Kashiwagi et al. | |
| 2002/0164095 A1 | 11/2002 | Nagai et al. | |
| 2004/0216543 A1 | 11/2004 | Nagai et al. | |
| 2005/0169559 A1 | 8/2005 | Mochizuki et al. | |
| 2005/0232521 A1 | 10/2005 | Kuellstaedt et al. | |
| 2005/0281497 A1 | 12/2005 | Akiyama et al. | |
| 2006/0078237 A1 | 4/2006 | Ishihara | |
| 2007/0251408 A1 | 11/2007 | Fletcher et al. | |
| 2008/0013871 A1 | 1/2008 | Kuellstaedt et al. | |
| 2009/0080816 A1 | 3/2009 | Schroeder | |
| 2009/0226122 A1 | 9/2009 | Schroeder | |
| 2009/0285513 A1 | 11/2009 | Schroeder | |
| 2010/0129013 A1 | 5/2010 | Schroeder et al. | |

FOREIGN PATENT DOCUMENTS

| | | |
|---|---|---|
| DE | 4102147 A1 | 7/1992 |
| DE | 4 428 558 A1 | 2/1996 |
| DE | 10249978 A1 | 5/2004 |
| EP | 0 213 160 A1 | 3/1987 |
| EP | 0 258 714 A1 | 3/1988 |
| EP | 0 353 396 A | 2/1990 |
| EP | 0 577 995 A2 | 1/1994 |
| FR | 2 537 896 A1 | 6/1984 |
| JP | 02-113114 A | 4/1990 |
| JP | 06-018727 U | 3/1994 |
| JP | 07-217651 A | 8/1995 |
| JP | 08-004764 | 1/1996 |
| JP | 2007-046691 A | 2/2007 |
| KR | 10-2007-0090920 | 9/2007 |
| WO | WO 86/04651 A1 | 8/1986 |
| WO | WO 03/000444 A1 | 1/2003 |
| WO | WO 2004/038244 A2 | 5/2004 |
| WO | WO 2006/061076 A1 | 6/2006 |
| WO | WO 2006/094734 | 9/2006 |
| WO | WO 2007/050239 A2 | 5/2007 |

OTHER PUBLICATIONS

U.S. Appl. No. 12/398,205, filed Mar. 5, 2009, Schroeder.
U.S. Appl. No. 12/690,509, filed Jan. 20, 2010, Schroeder.
SKF Motion Technologies, Product Datasheet, Speedi-Roll, LLEHS 15 Speedi-Roll product datasheet from website www.linearmotion.skf.com, 2 pages; Known to Applicant on or before Nov. 24, 2009.
SKF Motion Technologies, Product Datasheet, Speedi-Roll, LLEHS 15 L Speedi-Roll product datasheet from website www.linearmotion.skf.com, 2 pages; Known to Applicant on or before Nov. 24, 2009.
SKF Motion Technologies, Product Datasheet, Speedi-Roll, LLEHS 25 Speedi-Roll product datasheet from website www.linearmotion.skf.com, 2 pages; Known to Applicant on or before Nov. 24, 2009.
SKF Motion Technologies, Product Datasheet, Speedi-Roll, LLEHS 25 L Speedi-Roll product datasheet from website www.linearmotion.skf.com, 2 pages; Known to Applicant on or before Nov. 24, 2009.
SKF Motion Technologies, Product Datasheet, Speedi-Roll, LLEHS 35 Speedi-Roll product datasheet from website www.linearmotion.skf.com, 2 pages; Known to Applicant on or before Nov. 24, 2009.

GUIDE RAIL

CROSS-REFERENCE TO RELATED PATENT APPLICATIONS

This patent application is a continuation-in-part of U.S. patent application Ser. No. 12/690,509, filed on Jan. 20, 2010, which is a continuation-in-part of U.S. patent application Ser. No. 12/398,205, filed on Mar. 5, 2009, which claims the benefit of U.S. Provisional Patent Application No. 61/034,540, filed Mar. 7, 2008, the entire teachings and disclosures of which are incorporated herein by reference thereto.

FIELD OF THE INVENTION

This invention generally relates to guide rails and more particularly guide rails including a base rail including at least one raceway insert.

BACKGROUND OF THE INVENTION

Guide rails are used as a bearing and guide to support and direct the movement of a carriage, also known as a saddle, mounted to the guide rail. Such a carriage might be a component of a linear actuator, for example. In some embodiments, the carriages will include metal rollers or guide wheels that ride on raceways of the guide rail.

As technology continues to strive to reduce weight, manufacturing time and manufacturing costs (with an emphasis on material costs) while maintaining structural integrity and tolerancing, numerous guide rail configurations have been developed.

One particular configuration is the use of a base rail formed of a lighter weight, cheaper base material such as aluminum onto which harder, more wear resistant, and accurately toleranced raceways are mounted.

For example, U.S. Pat. No. 5,800,065 to Lyon teaches providing an extruded base member including a longitudinal groove on opposite sides of the base member. A carriage race is inserted into each of the grooves. The teachings and disclosure of U.S. Pat. No. 5,800,065 are hereby incorporated in its entirety by reference thereto.

U.S. Pat. No. 7,300,208 to Kuellstaedt teaches a similar guide rail that includes support ribs formed in the bottom of the grooves of the base member that are deformed during assembly of the guide rails. U.S. Pat. No. 7,300,208 emphasizes the importance of having the support ribs substantially parallel to the load transmission direction of the race. This configuration allows the support ribs to deform in a mushroom pattern with a portion of the rib deforming to both sides of the rib and permits, generally, placing the support ribs in a state of compression rather than bending. Further, these ribs extend at an angle relative to the direction in which the race is roller inserted into the grooves of the base member. The teachings and disclosure of U.S. Pat. No. 7,300,208 are hereby incorporated in its entirety by reference thereto.

Embodiments of the present invention provide improvements over the guide rails taught by U.S. Pat. No. 5,800,065, and by U.S. Pat. No. 7,300,208.

BRIEF SUMMARY OF THE INVENTION

The present invention has several aspects that may be claimed and stand as patentable independently and individually or in combination with other aspects, including but not limited to the following.

In one embodiment of the invention, a guide rail that includes a base rail having a channel therein and at least one finger extending from a portion of the channel. The guide rail further includes a race insert mounted against the at least one finger. In an embodiment of the invention, the race insert has a first and a second raceway. Further, the first and second raceways have different load transmission directions, wherein the load transmission directions of both the first and second raceways are oblique to the direction that the at least one finger extends from a portion of the channel.

In another embodiment of the invention, a method of forming a guide rail that includes the steps of forming a channel within a base rail, wherein the channel includes one or more fingers extending towards an opening of the channel, and mounting a race insert, having two raceways angled with respect to each other, within the channel such that the race insert is pressed into contact with each of the one ore more fingers. In at least one embodiment, mounting the race insert includes deforming each of the one or more fingers in the channel such that each of the one or more fingers is biased against the race insert.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
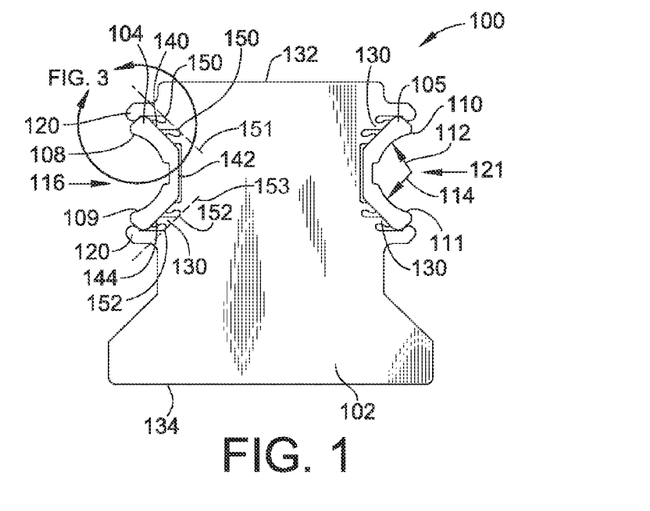
FIG. 1 is an exemplary embodiment of a guide rail in accordance with the teachings of the present invention.

FIG. 1 illustrates an embodiment of a guide rail 100 according to the teachings of the present invention. The guide rail 100 includes a base rail 102 and a pair of race inserts 104, 105 mounted to the base rail 102. The base rail 102 is preferably formed from a lighter and/or softer material than the race inserts 104, 105. Typically, the base rail 102 is an extrusion formed from aluminum and the race inserts 104, 105 are a steel or other wear-resistant material.

In an embodiment of the invention, the race inserts 104, 105 form a gothic arch profile, which includes raceways 108-111. As is known in the art, a ball bearing (not shown) carried by the raceways 108-111 will only contact each of the raceways 108-111 at a single point when using a gothic arch profile. Further, as is more fully described in U.S. Pat. No. 7,300,208, such a race insert 104, 105 includes two load transmission lines that extend at an angle relative to one another. These load transmission lines are illustrated by arrows 112, 114. However, as outlined below, other designs and profiles may be used while remaining within the scope of the present invention.

Figure 2:
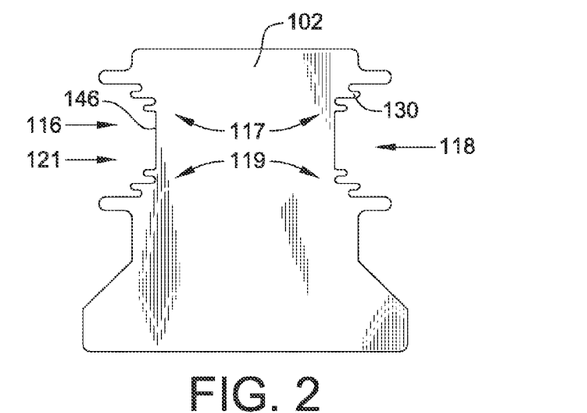
FIG. 2 is an end illustration of the base rail of the guide rail of FIG. 1.

The race inserts 104, 105 are mounted in grooves 116, 118 formed in opposing sides of the base rail 102. The base rail 102 includes four tabs 120. The grooves 116, 118 are defined as those portions of the base rail 102 between the two tabs 120 on the left side of the base rail 102, and between the two tabs 120 on the right side of the base rail 102. In the embodiment of FIGS. 1 and 2, the shape of the grooves 116, 118 is generally concave with respect to the base rail 102. Typically, tabs 120 are swaged over the ends of the race inserts 104, 105 to secure the race inserts 104, 105 within the grooves 116, 118. When assembling the guide rail 100, the race inserts are inserted laterally into the grooves 116, 118 along a direction illustrated generally by arrow 121.

Each of the grooves 116, 118 has a first portion 117 and a second portion 119. The grooves 116, 118 further include biasing fingers 130 such that each of the first and second portions 117, 119 includes at least one finger 130, wherein, collectively, the fingers 130 are configured to support the race inserts 104, 105. The grooves 116, 118 further include biasing fingers 130 that support the race inserts 104, 105. Prior to assembly of the guide rail 100, the fingers 130 extend generally parallel to one another, and parallel to the direction of insertion, i.e., arrow 121, and laterally outward from the base of grooves 116, 118. In this configuration, the fingers 130 are non-parallel with load transmission lines 112, 114.

During mounting of the race inserts 104, 105, the race inserts are inserted along the direction of arrow 121. During this process, a sufficient force is applied to the race inserts 104, 105 to cause the fingers 130 to deform substantially under a state of bending. More particularly, the fingers 130 associated with a top portion 110 of race insert 104, 105 bend toward the top 132 of the base rail 102 and therefore deform away from the bottom portion 111 of the race insert 104, 105. Similarly, the fingers 130 associated with a bottom portion 111 of race insert 104, 105 bend toward the bottom 134 of the base rail 102 and, therefore, deform away from the top portion 110 of the race insert 104, 105. Thus, the fingers 130 associated with the top portion 110 of the race insert 104, 105 bend away from the fingers 130 associated with the bottom portion 111 of the race insert 104, 105. During this assembly, the fingers are cammed against the back surfaces of the race inserts 104, 105 to cause the fingers to bend. In other words, the tips of the fingers contact the back surface of the race inserts 104, 105 and then as the race inserts 104, 105 are continually pushed into the grooves, the fingers 130 slide along back surface of the race inserts 104, 105 and are bent.

By placing the fingers 130 in a state of bending, it is contemplated that a more controlled deformation of the fingers 130 can be accomplished. As such, tolerancing of the raceways 108-111 is believed to be more accurately controlled. In some embodiments, the extent of bending the fingers 130 is between about 5 degrees and 35 degrees. Further, the bending may be more arcuate in nature than is illustrated in the figures.

With reference to FIG. 2, it will be noted that the configuration of the illustrated embodiment is free of undercuts between adjacent ones of the fingers 130 which can assist in the event that the fingers 130 are machined into the base rail 102. In such an arrangement, a grinder having a rotating axis extending perpendicularly to the insertion direction 121 can be used so that all of the fingers are cut with a grinding wheel rotating in the same direction. Thus, all material for each finger will be exposed to similar machining characteristics. If undercuts were provided, the grinding wheel would have to be inserted with an axis of rotation generally parallel to insertion direction 121 such that the top portion and bottom portion of fingers 130 would be ground by opposite sides of a wheel, which can provide different machining characteristics to the fingers 130, such as material flow directions.

Figure 3:
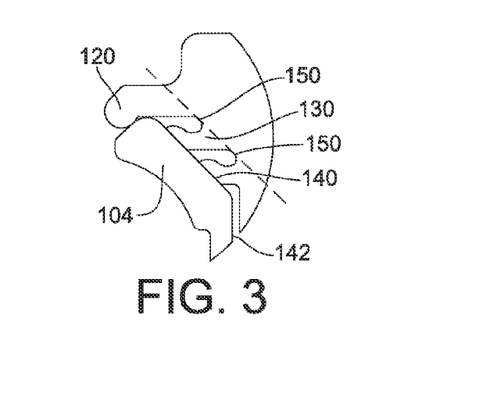
FIG. 3 is an enlarged partial illustration of the guide rail of FIG. 1 illustrating the mounting arrangement of a race insert mounted to the base rail.

In the illustrated embodiment of FIGS. 1-3, each race insert 104, 105 includes first, second and third back surface segments 140, 142, 144 (numbered and discussed in terms of race insert 104). The first and third back surface segments 140, 144 extend at non parallel and non-perpendicular angles to second back surface segment 142. In the illustrated embodiment, the first and third back surface segments 140, 144 face away from one another.

Prior to deformation of fingers 130 that associate with the first back surface 140, the tips of the fingers 130 generally are aligned at an angle relative to the bottom of the mounting groove 146 (see FIG. 2) that is approximately the same angle as the first back surface segment 140 aligns with the second back surface segment 142. The same arrangement is true with regard to the fingers 130 that associate with the third back surface 144. As such, a first line segment 151 passing through bases 150, and a second line segment 153 passing through bases 152 where the fingers 130 extend from are approximately parallel to the corresponding first or third back surface segments 140, 144.

Further, in the illustrated embodiment, no fingers 130 engage the second back surface 142. This is because back surface 142 is generally perpendicular to insertion direction 121. The use of fingers 130 to contact these regions would result in the fingers being axially mushroomed and placed into a state of compression rather than a state of bending as discussed previously.

As such, each of the fingers 130 extend laterally outward approximately the same distance. This distance is measured on a same side of the fingers 130 in which the fingers will be bent during insertion of the race inserts 104, 105. This arrangement promotes substantially constant bending forces throughout the various fingers 130 during assembly of the guide rail 100. This substantially constant distance is illustrated in FIG. 2. Further, as the fingers 130 are not compressed or mushroomed, the thickness of the fingers 130, perpendicular to the cantilevered length of the fingers 130, remains substantially constant even after assembly. This substantially constant thickness is provided by the beneficial arrangement of having the fingers 130 in a state of bending rather than a state of compression, further promoting more consistent loading of the race inserts 104, 105 by fingers 130 due to more controlled deformation of the fingers 130.

In the illustrated embodiment, only two fingers 130 are associated with a given back surface segment 140, 144. However, in alternate embodiments of the invention, a greater or lesser number of fingers can be used, depending on the length of the back surface and the desired support and resistance during assembly.

Figure 5:
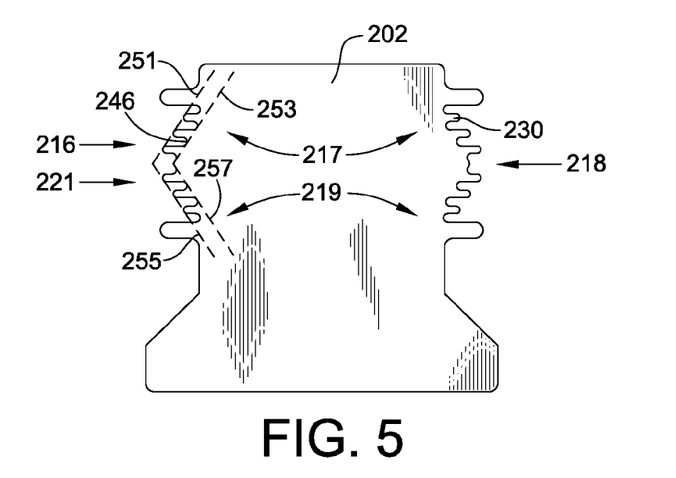
FIG. 5 is an end illustration of the base rail of the guide rail of FIG. 4.
Figure 6:
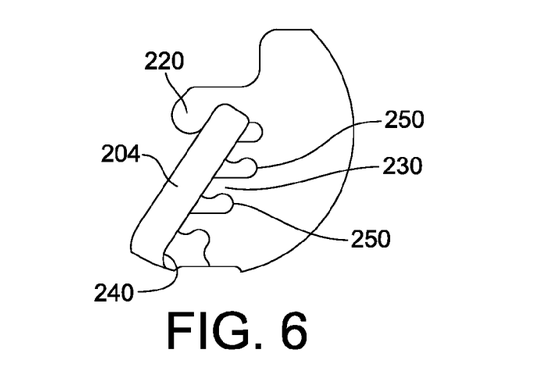
FIG. 6. is an enlarged partial illustration of the guide rail of FIG. 4, illustrating the mounting arrangement of the race insert mounted to the base rail.

In the illustrated embodiment of FIGS. 1-3, all of the fingers 130 that are associated with the first back surface segment 140 are laterally bent away from the fingers 130 that are associated with third back surface segment 140. This is because the first, and second surfaces face away from one another. However, if a different profile, such as V-profile were used, as illustrated in FIGS. 4-6, where the fingers are located internal to the V-profile, the fingers associated with one back surface segment would be laterally bent toward the fingers associated with the other back surface segment of the V-profile.

Figure 4:
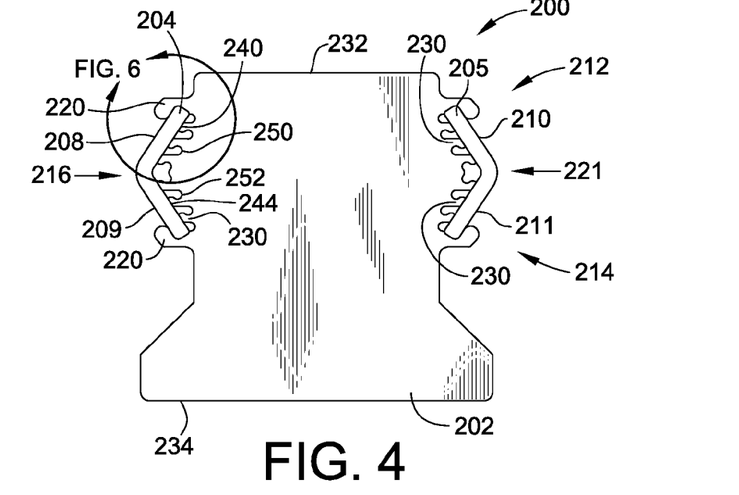
FIG. 4 is an alternate embodiment of a guide rail in accordance with the teachings of the present invention.

FIG. 4 illustrates a guide rail 200 according to the teachings of the present invention. The guide rail 200 includes a base rail 202 and a pair of race inserts 204, 205 mounted to the base rail 202. The base rail 202 is preferably formed from a lighter and/or softer material than the race inserts 204, 205. Typically, the base rail 202 is an extrusion formed from aluminum and the race inserts 204, 205 are a steel or other wear-resistant material.

In an embodiment of the invention, the race inserts 204, 205 form a V-shaped profile, which includes raceways 208-211. In this embodiment, the V-shaped race inserts 204, 205 each include two load transmission lines that extend at an angle relative to one another. These load transmission lines are illustrated by arrows 212, 214.

The race inserts 204, 205 are mounted in grooves 216, 218 formed in opposing sides of the base rail 202. The base rail 202 includes four tabs 220. The grooves 216, 218 are defined as those portions of the base rail 202 between the two tabs 220 on the left side of the base rail 202, and between the two tabs 220 on the right side of the base rail 202. In the embodiment of FIGS. 4 and 5, the shape of the grooves 216, 218 is generally convex with respect to the base rail 202. Typically, the tabs 220 are swaged over the ends of the race inserts 204, 205 to secure the race inserts 204, 205 within the grooves 216, 218. When assembling the guide rail 200, the race inserts are inserted laterally into the grooves 216, 218 along a direction illustrated generally by arrow 221.

Each of the grooves 216, 218 has a first portion 217 and a second portion 219. The grooves 216, 218 further include biasing fingers 230 such that each of the first and second portions 217, 219 includes at least one finger 230, wherein, collectively, the fingers 230 are configured to support the race inserts 204, 205. Prior to assembly of the guide rail 200, the fingers 230 extend generally parallel to one another, and parallel to the direction of insertion, i.e., arrow 221, and laterally outward from the base of grooves 216, 218. In this configuration, the fingers 230 are non-parallel with load transmission lines 212, 214.

During mounting of the race inserts 204, 205, the race inserts are inserted along the direction of arrow 221. As with the embodiment of FIG. 1, the mounting process involves applying a sufficient force to the race inserts 204, 205 to cause the fingers 230 to deform substantially under a state of bending. More particularly, the fingers 230 associated with a top portion 210 of race insert 204, 205 bend away from the top 232 of the base rail 202 and therefore deform towards the center of the race insert 204, 205. Similarly, the fingers 230 associated with a bottom portion 210 of race insert 204, 205 bend away from the bottom 234 of the base rail 202 and, therefore, deform towards the top portion 210 of the race insert 204, 205. Thus, the fingers 230 associated with the top portion 210 of the race insert 204, 205 bend toward the fingers 230 associated with the bottom portion 211 of the race insert 204, 205. During this assembly, the fingers are cammed against the back surfaces of the race inserts 204, 205 to cause the fingers to bend. In other words, the tips of the fingers contact the back surface of the race inserts 204, 205 and then as the race inserts 204, 205 are continually pushed into the grooves, the fingers 230 slide along back surface of the race inserts 204, 205 and are bent.

As explained above, placing the fingers 230 in a state of bending results in a more controlled deformation of the fingers 230, wherein the tolerancing of the raceways 208-211 is believed to be more accurately controlled. In some embodiments, the extent of bending the fingers 230 is between about 5 degrees and 35 degrees.

With respect to FIG. 5, it will be noted that the configuration of the illustrated embodiment is free of undercuts between adjacent fingers 230, which can assist in the event that the fingers 230 are machined into the base rail 202. In such an arrangement, a grinder having a rotating axis extending perpendicularly to the insertion direction 221 can be used so that all of the fingers are cut with a grinding wheel rotating in the same direction. Thus, all material for each finger will be exposed to similar machining characteristics. If undercuts were provided, the grinding wheel would have to be inserted with an axis of rotation generally parallel to insertion direction 221 such that the top portion and bottom portion of fingers 230 would be ground by opposite sides of a wheel, which can provide different machining characteristics to the fingers 230, such as material flow directions.

In the illustrated embodiment, each race insert 204, 205 includes first and second back surface segments 240, 244 (numbered and discussed in terms of race insert 204). The first and second back surface segments 240, 244 extend at non-parallel and non-perpendicular angles to each other. In the illustrated embodiment, the first and second back surface segments 240, 244 face towards one another.

Prior to deformation of fingers 230 that associate with the first back surface segment 240, a first line segment 251 passing through the tips of a portion of the fingers 230 is approximately parallel to a second line segment 253 passing through bases 250 of the fingers 230. As such, after assembly of the race insert 204, the first back surface 240 is approximately parallel to the first and second line segments 251, 253. Similarly, a third line segment 255 passing through the tips of another portion of the fingers 230 is approximately parallel to a fourth line segment 257 passing through bases 252 of the fingers 230, such that, after assembly of the race insert 204, the second back surface segment 244 is approximately parallel to the third and fourth line segments 255, 257.

As such, each of the fingers 230 extend laterally outward approximately the same distance. This distance is measured on a same side of the fingers 230 in which the fingers will be bent during insertion of the race inserts 204, 205. This arrangement promotes substantially constant bending forces throughout the various fingers 230 during assembly of the guide rail 200. This substantially constant distance is illustrated in FIG. 5. Further, because the fingers 230 are not compressed or mushroomed, the thickness of the fingers 230, perpendicular to the cantilevered length of the fingers 230, remains substantially constant even after assembly. This substantially constant thickness is provided by the beneficial arrangement of having the fingers 230 in a state of bending rather than a state of compression, further promoting more consistent loading of the race inserts 204, 205 by fingers 230.

In the illustrated embodiment, only three fingers 230 are associated with a given back surface segment 240, 244. However, in other embodiments, more or less fingers can be used depending on the length of the back surface and desired support and resistance during assembly. Further, all of the fingers 230 that are associated with the first back surface segment 240 are laterally bent towards the fingers 230 that are associated with second back surface segment 244. This is because the first and second back surface segments 240, 244 face one another.

Figure 7:
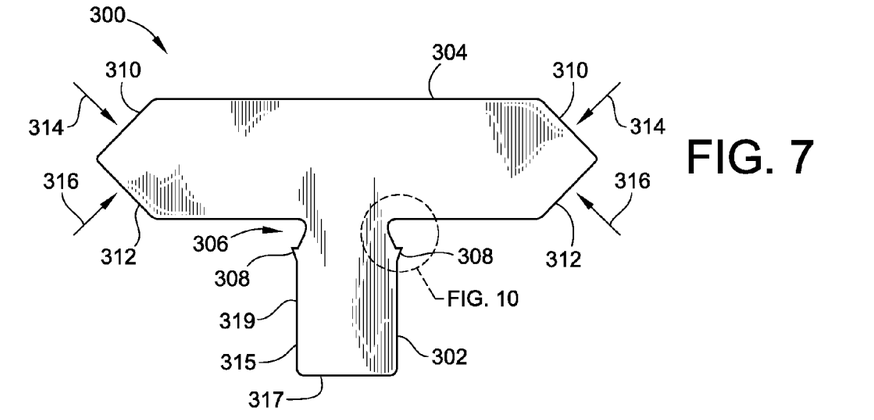
FIGS. 7, 8 and 9 are cross-sectional views of three embodiments of a race insert, each constructed in accordance with an embodiment of the invention.

FIG. 7 illustrates a race insert 300, constructed in accordance with an embodiment of the invention. It is envisioned that race insert 300 includes a vertical column 302, one end of which is joined proximate the midpoint of a horizontal beam 304, and substantially perpendicular to the horizontal beam 304. In alternate embodiments, the vertical column 302 may be joined to the horizontal beam 304 at a location other than the midpoint. In at least one embodiment, the vertical column 302 and the horizontal beam 304 are integral, made from a single piece of material. For example, the race insert 300 may be molded as a single piece, or machined from a single piece of material. In this context, integral means that the vertical column 302 and horizontal beam 304 are not two separate pieces that have been joined or attached. In at least one embodiment, a lower portion 315 of the vertical column 302 is tapered such that the bottom 317 of the race insert 300 is slightly narrower than a middle portion 319. In one embodiment, the lower portion 315 is tapered between one and three degrees.

However, it is contemplated that embodiments of the invention include race inserts 300 in which the vertical column 302 and horizontal beam 304 are not integral, that is made from separate, joined pieces. In the embodiment of FIG. 7, the vertical column 302 is narrowed at the top having inward-facing recesses 306 where the vertical column 302 and horizontal beam 304 meet. Just below the recesses 306, there is a barb 308 on each side of the vertical column 302. Each end of the horizontal beam 304 is formed into a V-shape comprising a top angled raceway 310 and a bottom angled raceway 312 that together form a raceway for a carriage 331 (shown in FIG. 12). In an embodiment of the invention, the top angled raceway 310 and bottom angled raceway 312 come together at an angle between 85 and 95 degrees. In this embodiment, the V-shaped surface formed by top and bottom angled raceways 310, 312 have directions of load transmission that extend at an angle relative to one another. The directions of these load transmissions are illustrated by arrows 314, 316.

Figure 8:
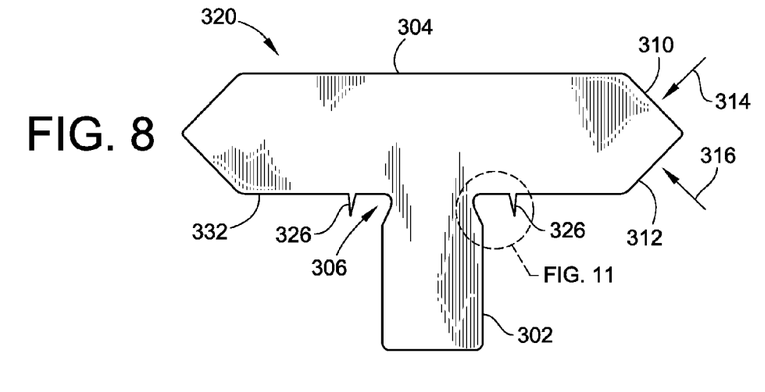
Figure 9:
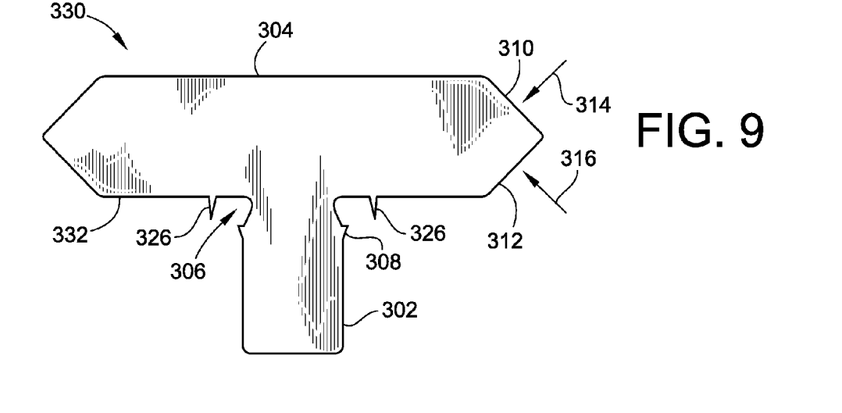

FIG. 8 illustrates a race insert 320 similar to race insert 300 of FIG. 7, except that the race insert 320 has no barbs 308, but instead has a pair of downward-facing spikes 326 descending from the horizontal beam 304, one on each side of the vertical column 302. FIG. 9 illustrates a race insert 330 similar to the race inserts 300, 320 of FIGS. 7 and 8, except that race insert 330 has both barbs 308 and spikes 326.

Figure 10:
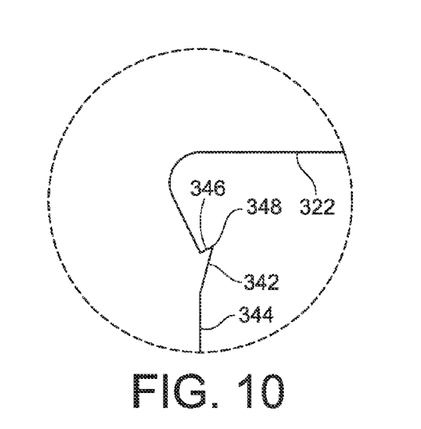
FIGS. 10 and 11 are respective close-up views of the barb shown in FIG. 7 and of the spike shown in FIG. 8.

In a particular embodiment, a portion of the race insert 300 of FIG. 7 is shown in FIG. 10. The barbs 308 extend outward from a surface 344 of vertical column 302 (shown in FIG. 7) approximately 0.1 to 0.2 millimeter, and each barb 308 is angled upward and outward toward the horizontal beam 304. In at least one embodiment, the barb 308 includes an outer surface 342 that has an angle between 10 degrees and 20 degrees relative to surface 344 of vertical column 302, while an inner surface 346 has and angle between 55 degrees and 65 degrees relative to surface 344. Further, in this embodiment the tip 348 of the barb 308 is between 1.0 and 1.3 millimeters below a bottom surface 332 of the horizontal beam 304 (shown in FIG. 7).

Figure 11:
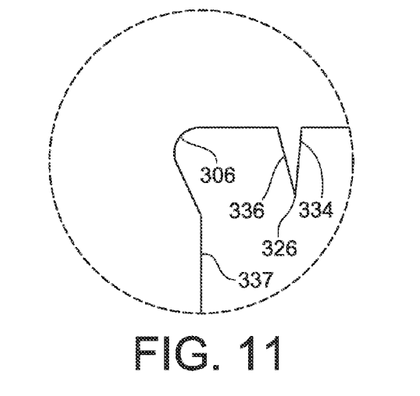

In a particular embodiment, a portion of the race insert 320 of FIG. 8 is shown in FIG. 11. The spikes 326 extend from the bottom surface 332 of the horizontal beam 304 (shown in FIG. 8) for a distance of approximately 0.9 to 1.0 millimeter. Further, the outside surface 334 of the spike 326 is substantially vertical, that is, substantially parallel to the vertical surface of the vertical column 302 (shown in FIG. 8), while the inside surface 336 is angled towards the center of the race insert 320 (shown in FIG. 8). In an embodiment of the invention, the inside surface 336 is angled between 15 and 25 degrees relative to the outside surface 334. In an embodiment, the inside surface 336 has an angle between 10 degrees and 20 degrees relative to a surface 337 of vertical column 302, while the outside surface 334 has and angle between zero degrees and 10 degrees relative to surface 337.

Figure 12:
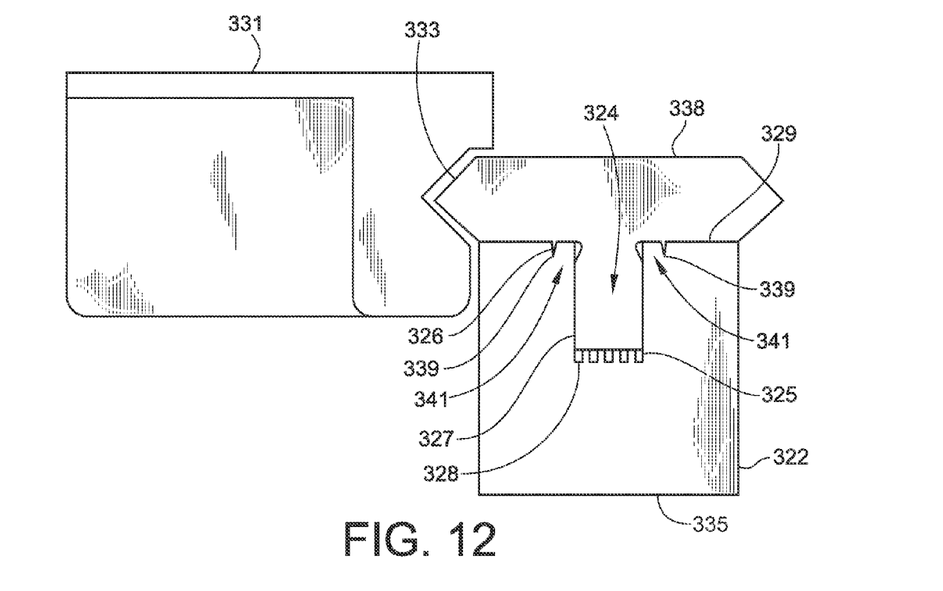
FIG. 12 is a cross-sectional view of an exemplary embodiment of a guide rail employing the race insert of FIG. 9, constructed in accordance with the teachings of the present invention.

The race insert 300, 320, 330 are configured to be inserted into a base rail 322 such as that shown in FIG. 12. In the embodiment of FIG. 12, the base rail 322 is a rectangular U-shaped component with a channel 324 configured to receive the vertical column 302 (shown in FIG. 9) of the race insert 300, 320, 330. As can be seen in FIG. 12, a bottom 328 of the channel 324 has a one or more fingers 325, which extend upwards from the bottom 328 of the channel 324 toward an opening of the channel 324, and which can deform and still support the vertical column 302 when a race insert 300, 320, 330 is pressed into the channel 324 of the base rail 322. In some embodiments, the base rail 322 is made of a relatively soft metal, such as aluminum, while the race insert 300, 320, 330 is made of a relatively harder metal, such as steel. This combination of materials allows the guide rail to be machined and assembled less expensively than many conventional guide rails made entirely from steel. However, it is contemplated that the base rail 322 and race insert 300, 320, 330 could be made from other materials, both metallic and non-metallic.

The ability of the one or more fingers 325 to deform when the race insert 300, 320, 330 is pressed into the channel 324 allows for more accurate positioning of the race insert 300, 320, 330 within the base rail 322. That is, the amount of deformation of the one or more fingers 325 may vary along the length of the base rail 322 to compensate for any dimensional variation in the race insert 300, 320, 330 or in the base rail 322 such that a constant distance can be maintained between the bottom surface 335 of the base rail 322 and a particular position on the top angled raceway 310 or bottom angled raceway 312. For example, the position of the raceways 310, 312 can be relatively more accurately maintained relative to a reference point (e.g., the bottom surface 335 of the base rail 322) such that a carriage riding along the length of the raceways 310, 312 would maintain a relatively constant distance from the reference point. Further, it can be seen from FIG. 12 that each of the top and bottom angled raceways 310, 312 are oblique to the bottom 328 of the channel 324. As such, the directions of the load transmissions 314, 316 are also oblique to the bottom 328 of the channel 324, and oblique to the direction in which the one or more fingers.

The race insert 300 is configured to be held in the base rail 322 by the barbs 308. In at least one embodiment, the width of the channel is approximately equal to the width of the vertical column 302 including the barbs 308, that is, the horizontal distance between the tips of the barbs 308. When the top of each side of the base rail 322 is pressed inward into the recesses 306, the outward-facing barbs 308 penetrate and anchor into the sidewalls 327 of the channel 324 holding the race insert 300 in the base rail 322.

The race insert 320 is configured to be held in the base rail 322 by the spikes 326. In at least one embodiment, the width of the channel is approximately equal to the width of the vertical column 302, and the top surface 329 of the base rail 322 has two grooves 339 positioned to receive the spikes 326.

Because the spikes 326 have a substantially vertical outside surface 334 and an angled inside surface 336, when the spikes 326 are pressed into the grooves 339, a portion 341 of the base rail 322, located inward of the grooves 339, is forced into the recesses 306 such that the top of the channel 324 is narrower than the width of the vertical column 302, thus holding the race insert 320 in the base rail 322.

The race insert 330 is configured to be held in the base rail 322 by both barbs 308 and spikes 326. When the race insert 330 is pressed into the base rail 322 and a portion of the base rail 322 inside the grooves is forced into the recesses 306 (shown in FIG. 9) by the spikes 326, such that the top of the channel 324 is narrower than the width of the vertical column 302, the barbs 308 also penetrate and anchor into the sidewalls 327 of the channel 324 holding the race insert 330 in the base rail 322. In an embodiment, the carriage 331 includes rollers 333 angled such that the rollers 333 ride squarely on the raceway top and bottom angled raceways 310, 312 (shown in FIG. 9).

Figure 13:
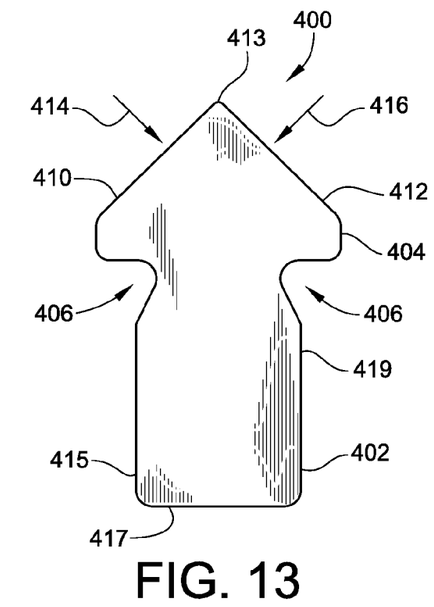
FIG. 13 is a cross-sectional view of a race insert, constructed in accordance with a particular embodiment of the invention.

FIG. 13 is a side view of a race insert 400, constructed in accordance with an embodiment of the invention. In an embodiment, the race insert 400 includes a column 402 integrally joined to a triangular head portion 404. In at least one embodiment, the column 402 and the triangular head portion 404 are integral, made from a single piece of material. For example, the race insert 400 may be molded as a single piece, or machined from a single piece of material. In this context, integral means that the vertical column 402 and triangular head portion 404 are not two separate pieces that have been joined or attached. However, it is contemplated that embodiments of the invention include race inserts 400 in which the vertical column 402 and triangular head portion 404 are not integral, that is made from separate, joined pieces. In at least one embodiment, a lower portion 415 of the vertical column 402 is tapered such that the bottom 417 of the race insert 400 is slightly narrower than a middle portion 419. In one embodiment, the lower portion 415 is tapered between one and three degrees.

In the embodiment of FIG. 13, the column 402 is narrowed at the top having inward-facing recesses 406 where the column 402 and the triangular head portion 404 meet. The triangular head portion 404 is formed into a V-shape comprising two angled raceways 410, 412 that meet at a vertex 413, and together form a raceway for a carriage (not shown). In an embodiment of the invention, the two angled raceways 410, 412 come together at an angle between 85 and 95 degrees. In this embodiment, the V-shaped surface formed by the two angled raceways 410, 412 have directions of load transmission that extend at an angle relative to one another. The directions of these load transmissions are illustrated by arrows 414, 416.

Figure 14:
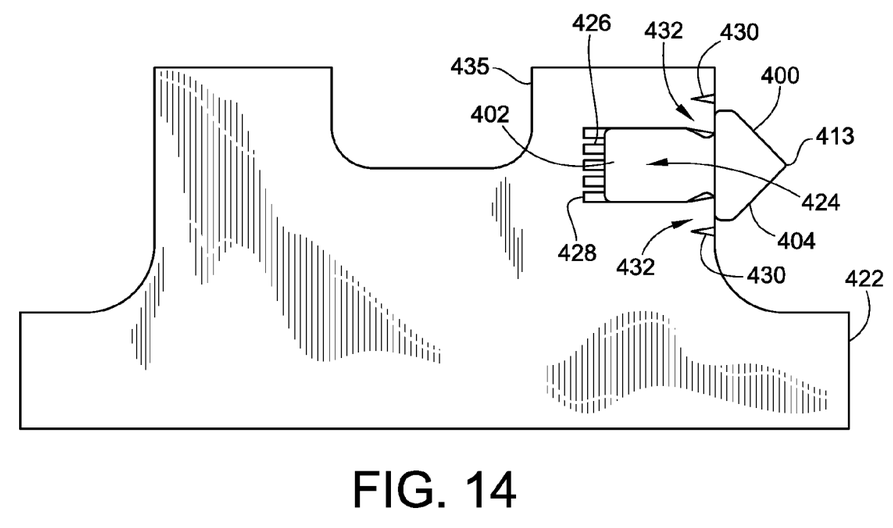
FIG. 14 is a cross-sectional view of a guide rail that includes the race insert of FIG. 13.

The race insert 400 is configured to be inserted into a base rail 422 such as that shown in FIG. 14. In the embodiment of FIG. 14, the base rail 422 includes a horizontal channel 424 configured to receive the column 402 of the race insert 400. In an embodiment of the invention, the bottom of the horizontal channel 424 includes one or more fingers 426, which extend horizontally from the end 428 of the horizontal channel 424 toward an opening of the channel 424, and which can deform and support the race insert 400 when a staking operation is used to press the column 402 into the horizontal channel 424. In an alternate embodiment of the invention, a swaging operation is used to fix the race insert 400 into the horizontal channel 424 having one or more fingers 426 extending horizontally from the end 428 of the horizontal channel 424.

However, in at least one embodiment, when the race insert 400 is swaged in the base rail 422, the horizontal channel 424 has no fingers.

The ability of the one or more fingers 426 to deform when the race insert 400 is pressed into the channel 424 allows for more accurate positioning of the race insert 400 within the base rail 422. That is, the amount of deformation of the one or more fingers 426 may vary along the length of the base rail 422 to compensate for any dimensional variation in the race insert 400 or in the base rail 422 such that a carriage (not shown) riding along race insert 400 would maintain a relatively constant distance relative to between the carriage and, for example, a sidewall 435 of the base rail 422. Further, it can be seen from FIG. 14 that each of the top and bottom angled raceways 410, 412 are oblique to the bottom 428 of the channel 424. As such, the directions of the load transmissions 414, 416 are also oblique to the bottom 428 of the channel 424.

The base rail 422 includes grooves 430 configured to receive a portion of the insertion tool used to press the race insert 400 into the base rail 422. During assembly, a portion of the insertion tool is inserted into the grooves 430 forcing a portion 432 of the race insert 400 into each recess 406 (shown in FIG. 13) of the race insert 400, thus holding the race insert 400 in the channel 424. In this embodiment, the grooves 430 are spaced apart at a distance greater than the width of the triangular head portion 404.

In some embodiments, the base rail 422 is made of a relatively soft metal, such as aluminum, while the race insert 400 is made of a relatively harder metal, such as steel. This combination of materials allows the guide rail to be machined and assembled less expensively than many conventional guide rails made entirely from steel. However, it is contemplated that the base rail 422 and race insert 400 could be made from other materials, both metallic and non-metallic.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A guide rail comprising:
a base rail having a channel therein;
at least one finger extending from a portion of the channel;
a race insert mounted against the at least one finger and configured to deform the at least one finger when so mounted, the race insert having a first and second raceway;
wherein the first and second raceways have different load transmission directions, wherein, prior to mounting the race insert to the base rail, the load transmission directions of both the first and second raceways are oblique to the direction that the at least one finger extends from a portion of the channel.

2. The guide rail of claim 1, wherein the race insert comprises:
a column having an end that is joined to a beam at some point between the ends of the beam;
wherein the column is recessed on each side where the column is joined to the beam; and
wherein each end of the beam includes first and second raceways that come together at an angle such that each end of the beam is V-shaped.

3. The guide rail of claim 2, wherein the beam and column are substantially perpendicular to each other.

4. The guide rail of claim 2, wherein the column has a barb on each side of the column, the barbs configured to penetrate and anchor into sidewalls of the channel to hold the race insert in the channel.

5. The guide rail of claim 4, wherein the beam has a spike on each side of the column, the spike extending in the same direction as the column, and wherein the spikes are configured to force a portion of the base rail laterally into the recesses.

6. The guide rail of claim 2, wherein the beam has a spike on each side of the column, the spike extending in the same direction as the column, and wherein the spikes are configured to force a portion of the base rail laterally into the recesses to hold the race insert in the channel.

7. The guide rail of claim 6, wherein the base rail includes two grooves formed therein, the channel interposed between the grooves, each of the grooves receiving a corresponding one of the spikes.

8. The guide rail of claim 1, wherein the at least one finger extends in a direction that is oblique to the two directions of load transmission.

9. The guide rail of claim 1, wherein the race insert comprises a column joined at one end to a triangular head portion that includes first and second raceways which come together at an angle such that the combined raceways form a V-shaped end facing away from the column, and wherein the column includes recesses on each side where the column is joined to the triangular head portion.

10. The guide rail of claim 9, wherein the base rail includes two grooves with a channel interposed therebetween, the grooves spaced apart a distance greater than a width of the triangular head portion, wherein material between each groove and the channel is configured to move laterally into the recesses.

11. The guide rail of claim 1, wherein the base rail is made from a softer material than the race insert.

12. The guide rail of claim 11, wherein the base rail is made from aluminum and the race insert is made from steel.

13. The guide rail of claim 1, wherein the race insert has a V-shaped profile.

14. The guide rail of claim 1, wherein the race insert has an arch-shaped profile.

* * * * *